UNITED STATES PATENT OFFICE.

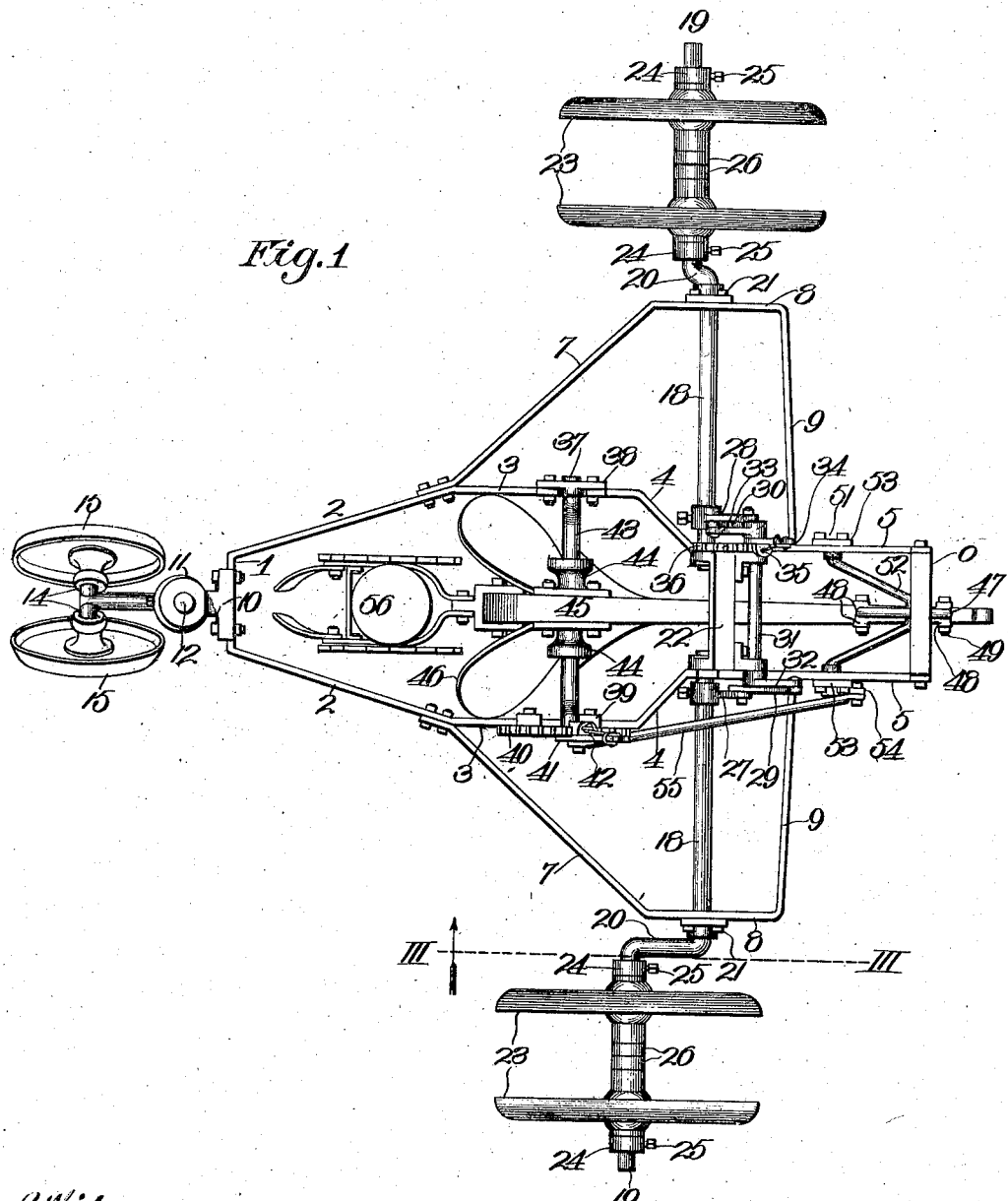

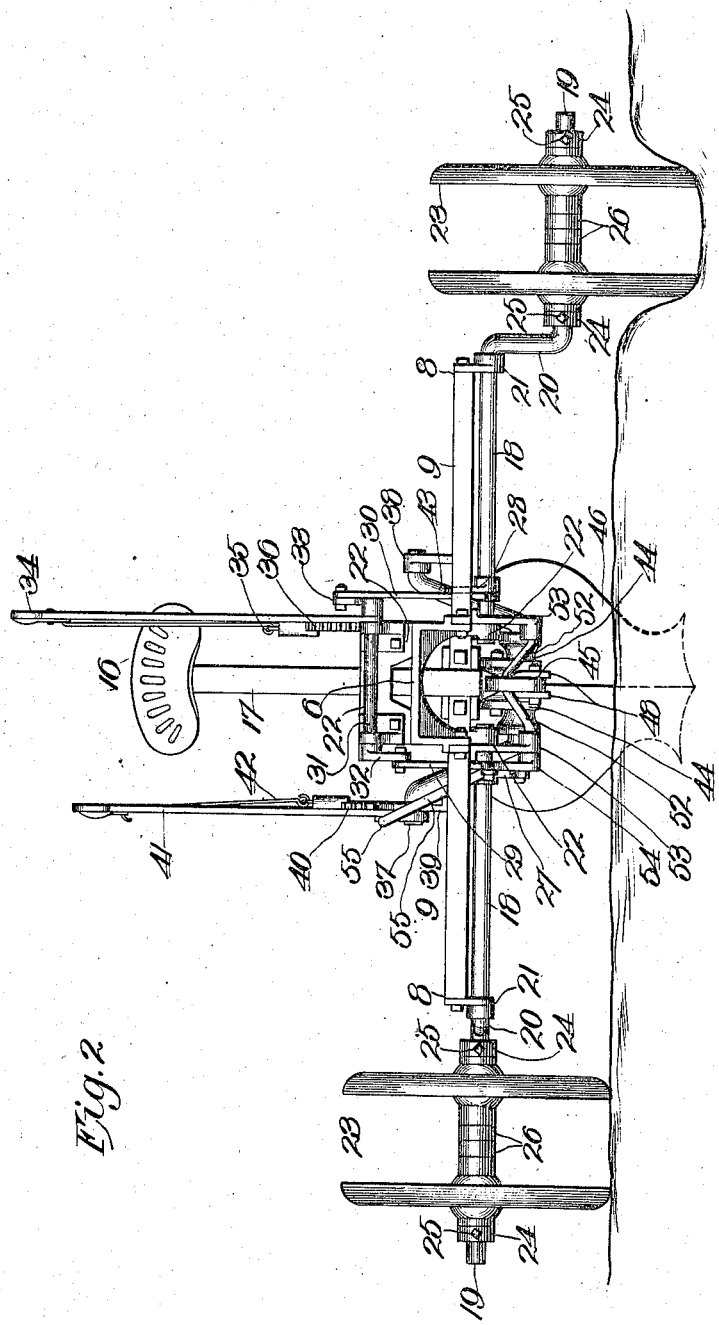

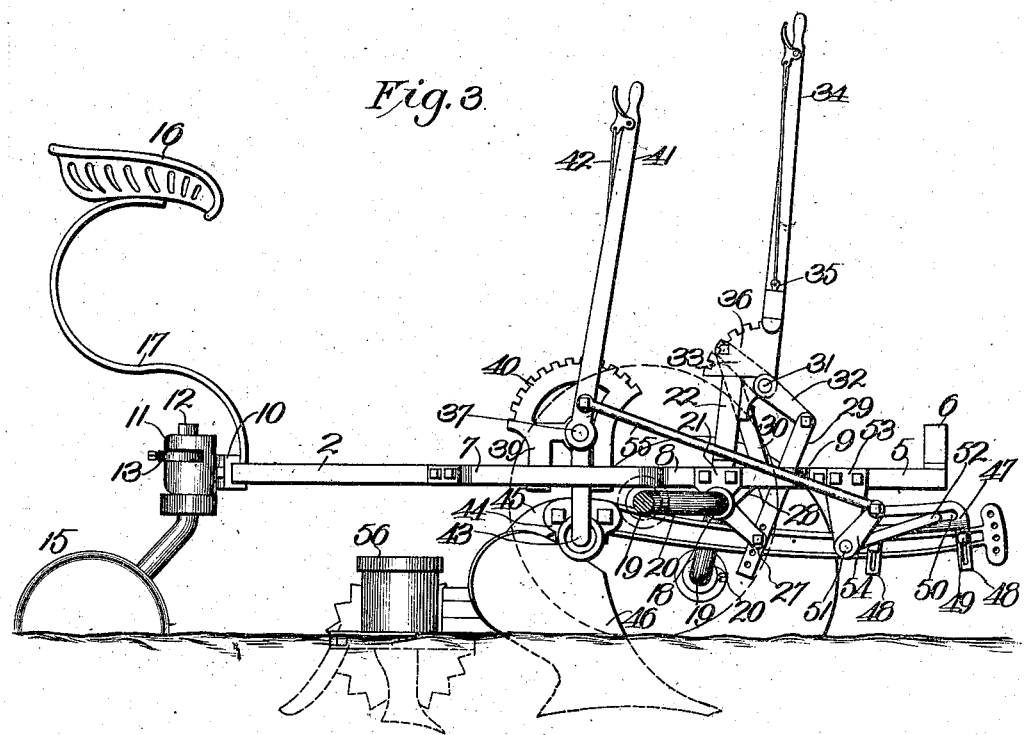

ANDREW SHEARER, OF FRANKFORT, KANSAS.

LISTER-PLOW.

No. 894,802.　　　Specification of Letters Patent.　　　Patented July 28, 1908.

Application filed November 4, 1907. Serial No. 400,562.

*To all whom it may concern:*

Be it known that I, ANDREW SHEARER, a citizen of the United States, residing at Frankfort, in the county of Marshall and State of Kansas, have invented certain new and useful Improvements in Lister-Plows, of which the following is a specification.

This invention relates to lister plows and my object is to produce a machine having a wheel-support at one side to run in the furrow, a wheel-support at the opposite side to run on unbroken ground, a plow to produce a furrow parallel to that occupied by the first-named wheel-support, and a wheel-support to travel in the furrow being made by the plow, and means whereby the operation of a single lever shall result in reversing the positions of the side-wheel supports without affecting the depth or level of the plow.

A further object is to produce means for vertically adjusting and supporting the plow at varying heights without changing its angle and therefore its suctional relation to the ground.

Another object is to produce a machine which cannot tip over and is easily guided by providing a low-down frame, open at its center, with small wheels two rows apart, and axles therefor at opposite sides of said opening to permit the plow and its beam to be raised into said opening between the axles.

Another object is to produce a plow having a pair of axles each equipped with a pair of wheels capable of being disposed at varying distances apart to correspond to the width of the furrow turned by the plow.

With these general objects in view and others as hereinafter appear, the invention consists in certain novel and peculiar features of construction and organization as hereinafter described and claimed; and in order that it may be fully understood reference is to be had to the accompanying drawings, in which—

Figure 1, is a top plan view, with the seat omitted, of a lister plow embodying my invention. Fig. 2, is a front view of the machine. Fig. 3, is a section on line III—III of Fig. 1. Fig. 4, is a detail perspective view of the inner ends of the crank axles and crank shaft above the same and the links pivotally connecting said crank shaft with the said axles.

In the drawings a frame open at its center is preferably constructed of a metal bar bent to form the transverse rear portion 1, side portions 2 diverging forwardly from portion 1, parallel portions 3 extending forward from the diverging portions 2, forwardly converging portions 4 projecting from the front ends of portions 3 and parallel portions 5 projecting from the front ends of portions 4, the frame being completed preferably by uniting the front ends of the portions 5 together by an arch 6. The frame is widened at the proper point by means of a pair of lateral extensions or wings formed preferably of bars secured at their ends to the body of the frame already described, and bent to form arms 7 diverging forwardly from the body, the parallel arms 8 at the front ends of arms 7 and the substantially alined transversely arranged arms 9 extending inwardly from the front ends of arms 8.

10 is a bracket secured rigidly as shown or in any other suitable manner to the rear end of the body of the rigid frame described and provided with a vertical sleeve 11 to provide a journal for the upper portion of a caster rod 12, the sleeve being slotted to receive the collar 13 mounted upon the rod to prevent it moving vertically in the sleeve, or any other suitable means to accomplish the same purpose may be employed.

14 are downwardly diverging branch arms for the rod 12 and 15 are caster wheels journaled on said arms and adapted to swing around as a single caster when rod 12 is free to turn in sleeve 11, it being understood that when the machine is in actual operation the said caster is secured rigidly as regards swivel movement to the frame, the means for locking and unlocking the caster rod to the frame being unimportant as regards this application.

16 indicates the seat arranged vertically over the caster and secured to the upper end of a spring support 17 attached at its lower end in any suitable manner, to the rear end of the frame.

A pair of axles consist of the transversely extending alined portions 18, the transversely extending portions 19, and the crank portions 20 connecting the outer ends of portions 18 with portions 19 and extending by preference at approximately an angle of forty-five degrees to each other. The portions 18 extend through and are journaled in bearing brackets 21 secured to and depending from the wings of the frame and at their inner ends are journaled in the lower ends of an arch 22 connecting the rear ends of portions 5 of the body portion of the frame, the arch being made rigid with the frame in any suitable manner. Wheels 23 are journaled on portions 19 of the crank axles described, between collars 24 secured on said portions of the crank axles by set screws 25 or in any equivalent manner, one or more spacing sleeves 26 being also mounted on each portion 19 between its respective wheels 23. 27 and 28 indicate short cranks secured on said crank axles near their inner ends and projecting from the same with respect to each other at the same angle that cranks 20 bear to each other,—it being noticed, however, that crank 27 of the right hand crank axle projects from the opposite side of said axle from its companion crank 20 and that the same is true of the cranks of the lefthand axle.

29 and 30 are links pivoted at any desired point near their lower ends, to cranks 27 and 29 respectively. The link 29 is pivoted at its upper end to the forwardly projecting crank 32 of a short shaft 31, the upper end of link 30 being pivoted to the oppositely projecting crank 33 at the opposite end of shaft 31. Crank shaft 31 is arranged parallel with the wheel-carrying crank axles described and is disposed about vertically over the pivotal points of connection of cranks 27 and 28 with links 29 and 30 when the left hand wheels 23 are in a furrow and the right hand wheels are upon unbroken ground, the said crank shaft 31 being journaled in parts cast with or rigidly secured to the upper end of the arch 22.

34 is a lever secured rigidly to the shaft 31 at its left hand end by preference, and provided with a catch mechanism 35, for engagement with the sector 36 also cast with or rigidly secured to the arch.

37 is a transverse bail arranged about midway the length of the frame and journaled at its ends in brackets 38 and 39 secured rigidly to and projecting upward from portions 3 of the frame, the right hand bracket by preference being formed with the toothed sector 40. 41 is a lever secured to the right hand end of bail 37 and 42 a catch mechanism carried thereby for engagement with the sector 40. The crank portion 43 of the bail depends through the opening of the frame and is journaled in bearing brackets 44 secured to opposite sides of and depending from the longitudinally extending beam 45 of a plow 46.

47 indicates a bracket secured to the front portion of the beam forward of the wheel-carrying crank shafts and provided with depending bifurcated and slotted arms 48 fitting over said beam, bolts 49 extending through said arms and beam for the purpose of securing bracket 47 at the desired height above the beam, the bracket being longitudinally slotted to provide a longitudinal slot 50 for the beam, in which slidingly fits the crank portion 52 of a V-shaped bail 51, journaled at its opposite ends in brackets 53 secured to and depending from portions 5 of the frame.

54 indicates a short crank arm secured to and projecting upward from the right hand end by preference, of bail 51, and 55 is a rod pivotally linking the said crank arm 54 with lever 41.

56 is a drill of any suitable type carried by and rearward of the plow in any suitable manner, reference to the detail construction of the drill being omitted as forming no dependent part of the present invention.

Before proceeding with the description of the method of operating the machine it is desired to call attention to the fact that the machine possesses the greatest stability by reason of the fact that it is much lower than ordinary three wheeled plows, the arches being provided to accommodate the beam when the plow is elevated above the ground. Said arches furthermore coöperate with any suitable bracing, not shown, in making the comparatively wide and light frame thoroughly stiff and rigid, it being also noted in this connection that the body of the frame is of such character as to permit the plow to play vertically through it when raised and lowered. It is also desired to call attention to the fact that the employment of comparatively small carrying wheels permits of the use of the low frame and that with low wheels the machine can be guided more easily in the path desired because the pair of wheels which will travel in the furrow cannot so easily roll up out of such furrow as large wheels.

In the ordinary operation of the machine the parts will be arranged as shown, the crank of the lifting bail being vertically pendent and the crank of the left-hand carrying axle disposed downward and slightly rearward and the crank of the right-hand wheel-carrying axle projecting rearward, this arrangement disposing both sets of carrying wheels rearward of the axis of their axles and almost directly opposite each other, it being understood that the furrow occupied by the depressed or left-hand wheels is that which was made by the plow in the preceding trip of the machine across the field, it being further noted that the caster travels in the furrow being turned at the time by the plow and that as hereinbefore explained, it is held rigid when the plow is depressed and will be free to turn as a caster when the plow is elevated or in inoperative position. It will also be noted that when the plow is depressed to operative position by swinging the lifting lever 41 forward, the link rod 55 swings crank arm 54 forward so as to cause the bail 52 to slide forward on and press the front end of the beam downward at the same time for the purpose of preserving the proper position of the plow, to maintain its required suction on the ground irrespective of its depth.

Heretofore lister plows have been suspended from a wheeled frame by two bails connected to the beam substantially like the lifting bail of this application, but such constructions are objectionable in that the beam is maintained rigidly in a certain relation with the ground and consequently the plow will only work well at a particular depth, so that if the plow should go deeper, the wheel behind it would of course drop also and thus lower the rear end of the beam and change the pitch of the plow so that the latter will tend to move upward and produce a furrow of unequal depth. On the other hand if a single bail is employed to support the plow and it is attempted by means of the lever to force the plow deeper into the ground, the point of the plow will become higher than the heel and if the lever is moved far enough the weight of the frame and of the driver will be carried by the plow and impose a killing weight on the horses. By having the bracket 47 vertically adjustable so as to vary the height of slot 50 the angle of the plow can be changed so as to give it a different angle or suction with relation to the ground, this adjustment being desirable to accommodate the condition of the ground or the degree of sharpness of the plow. When the ground is very rough the bracket 47 may be entirely omitted so as to allow the beam to play downward freely in the event that the wheels run over clods or other obstructions in their paths.

In the practical operation, the depressed wheels 23 run in the last-made furrow as shown in Fig. 2 and the caster runs in the furrow being made by the plow and coöperates with the depressed wheels in compelling the plow to parallel the furrow occupied by the depressed wheels, it being noticed that by disposing both sets of wheels 23 with their axes rearward of the axes of portions 18 of their carrying axles, the machine tends to travel in a more straight and direct course than if the distance between said wheels, measured longitudinally of the machine was greater. After the furrow has been completed, the operator by pulling rearward on lever 41 raises the plow out of the ground and incidentally the drill, and before turning the machine, he operates lever 34 so as to simultaneously raise the left hand and lower the right hand wheels 23 until their axes are longitudinally alined, thus bringing the said wheels to the same level to permit the machine to be turned more easily. If the machine is to be driven across the field in the opposite direction to that which it followed in making the last furrow, he continues the said movement of lever 34 after the turn is made for the purpose of raising the left-hand wheels to the plane of the unbroken ground and lowering the right hand wheels to the plane of the bottom of the furrows so that the machine on the return trip shall produce a new furrow with the originally elevated wheels running in the last-named furrow and the originally depressed wheels running upon the unbroken ground, it being apparent that the reversal of the positions of the wheels occurs without affecting the depth of the plow or varying its angle or level with respect to the ground.

From the above description it will be apparent that I have produced a lister plow possessing the features of advantage enumerated as desirable in the statement of the object of the invention and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. A lister plow comprising a suitable frame, a pair of crank axles journaled therein and having their cranked portions disposed at an angle to each other, wheels journaled on the cranked ends of said shafts, a second pair of cranks projecting from said axles and disposed at an angle to each other and at the opposite sides of the axes of said axles from their first-named cranks, a crank shaft suitably journaled above the crank axles and provided with oppositely projecting cranks, links pivotally connecting said oppositely projecting cranks with the second crank arms of the axles, and means to operate the crank shaft linked to the wheel-carrying crank axles.

2. A lister plow, comprising a suitable frame, a pair of crank axles journaled therein and having their cranked portions disposed at an angle to each other, wheels journaled on the cranked ends of said axles, a second pair of cranks projecting from said axles and disposed at an angle to each other and at the opposite side of the axes of said axles from their first-named cranks, a crank shaft suitably journaled above the crank axles and provided with oppositely projecting cranks, links pivotally connecting said oppositely projecting cranks with the second crank arms of the axles, means to operate the crank shaft linked to the wheel-carrying crank axles, and means to secure said shaft at the desired point of adjustment.

3. A lister plow, comprising a suitable frame, a pair of crank axles journaled therein and having their cranked portions disposed at an angle to each other, wheels journaled on the cranked ends of said axles, a second pair of cranks projecting from said axles and disposed at an angle to each other and at the opposite side of the axes of said axles from their first-named cranks, a crank shaft suitably journaled above the crank axles and provided with oppositely projecting cranks, links pivotally connecting said oppositely projecting cranks with the second crank arms of the said crank axles, a lever secured to the crank shaft and provided with a catch mechanism, and a notched sector rigid with relation to the frame and adapted to be engaged by said catch mechanism.

4. A lister plow, comprising a suitable skeleton frame having a central longitudinally extending opening, an arch bridging said opening and carried by and projecting above the body of the frame, a crank shaft suitably journaled on said arch above the body of the frame with its cranks projecting in opposite directions, a pair of transverse crank axles suitably journaled below and rearward of said crank shaft and terminating at opposite sides of the center of the frame at their inner ends and provided at their outer ends with cranks disposed at an angle to each other and at their inner ends with a second pair of cranks disposed at an angle to each other, links pivotally connecting the said second set of cranks to the crank shaft, wheels journaled on the cranks at the outer ends of said axles, and means to operate the crank shaft.

5. A lister plow, comprising a suitable frame wheel-supported at its rear end, a pair of transversely extending alined axles journaled in said frame and terminating short of its center at their inner ends and provided at such ends with cranks and at their outer ends in a second pair of cranks, wheels journaled on said second pair of cranks, a shaft above and bridging the space between the inner ends of the axles and provided with oppositely projecting cranks at its ends, and links pivotally connecting said cranks with the first-named cranks of said axles.

6. A lister plow, comprising a suitable frame wheel-supported at its rear end, a pair of transversely extending alined axles journaled in said frame and terminating short of of its center at their inner ends and provided at such ends with cranks and at their outer ends in a second pair of cranks, wheels journaled on said second pair of cranks, a shaft above and bridging the space between the inner ends of the axles and provided with oppositely projecting cranks at its ends, links pivotally connecting said cranks with the first-named cranks of said axles, a pair of bails arranged one in front and the other behind the axles and bearing a journaled relation to the frame, a lister plow below the rear bail and provided with a beam journaled on said bail and underlying the first-named bail, and means for simultaneously operating said bails to impart vertical movement to the plow and beam.

7. A lister plow, comprising a suitable frame wheel-supported at its rear end, a pair of transversely extending alined axles journaled in said frame and terminating short of its center at their inner ends and provided at such ends with cranks and at their outer ends in a second pair of cranks, wheels journaled on said second pair of cranks, a shaft above and bridging the space between the inner ends of the axles and provided with oppositely projecting cranks at its ends, links pivotally connecting said cranks with the first-named cranks of said axles, a pair of bails arranged one in front and the other behind the axles and bearing a journaled relation to the frame, a lister plow below the rear bail and provided with a beam journaled on said bail and underlying the first-named bail, a lever secured to the rear bail, a crank arm secured to the front bail, a link rod connecting said lever and crank arm, and means to lock the lever at any desired point of adjustment.

8. A lister plow, comprising a suitable frame having a longitudinally extending opening and arches bridging said opening, a wheel support for the rear end of the frame, wheel supports at opposite sides of the frame, a bail suitably journaled with relation to the frame and having its crank portion capable of playing through the opening of the frame, a second bail suitably journaled with relation of the frame and having its cranked portion capable of playing through said opening and provided with a crank arm, a lever secured to the first-named bail and pivotally linked to the crank of the second one, a lister plow centrally of the frame and pivotally suspended from the first-named bail, having its beam provided with a longitudinal slot in engagement with the cranked portion of the second bail, and means for varying the height of the slot with respect to the beam.

In testimony whereof I affix my signature, in the presence of two witnesses.

ANDREW SHEARER.

Witnesses:
W. J. GREGG,
G. D. OSBORN.